United States Patent
Yanagihara et al.

(10) Patent No.: US 10,735,543 B2
(45) Date of Patent: Aug. 4, 2020

(54) DEVICE-TO-DEVICE CACHING

(71) Applicant: Apple Inc., Cupertino, CA (US)

(72) Inventors: Kazuhisa Yanagihara, Cupertino, CA (US); Daniel M. Zitter, Cupertino, CA (US); Jason R. Thorpe, San Francisco, CA (US); Michael Abbott, Woodbury, MN (US)

(73) Assignee: Apple Inc., Cupertino, CA (US)

( * ) Notice: Subject to any disclaimer, the term of this patent is extended or adjusted under 35 U.S.C. 154(b) by 725 days.

(21) Appl. No.: 14/732,600

(22) Filed: Jun. 5, 2015

(65) Prior Publication Data

US 2016/0359999 A1 Dec. 8, 2016

(51) Int. Cl.
*G06F 15/167* (2006.01)
*H04L 29/08* (2006.01)

(52) U.S. Cl.
CPC ...... *H04L 67/2842* (2013.01); *H04L 67/1014* (2013.01)

(58) Field of Classification Search
CPC .................. H04L 67/2842; H04L 67/1014
See application file for complete search history.

(56) References Cited

U.S. PATENT DOCUMENTS

| | | | | |
|---|---|---|---|---|
| 7,818,402 B1* | 10/2010 | Zhang | ................. | H04L 61/1582 |
| | | | | 709/219 |
| 2003/0177181 A1* | 9/2003 | Chalon | ............. | H04L 29/12009 |
| | | | | 709/203 |
| 2007/0078959 A1* | 4/2007 | Ye | ........................... | H04L 67/16 |
| | | | | 709/223 |
| 2012/0173356 A1 | 7/2012 | Fan et al. | | |
| 2012/0246257 A1* | 9/2012 | Brown | .............. | G06F 17/30902 |
| | | | | 709/213 |
| 2013/0275530 A1* | 10/2013 | Matson | ................... | H04L 51/24 |
| | | | | 709/206 |
| 2013/0339526 A1* | 12/2013 | Ruellan | .............. | H04L 67/2814 |
| | | | | 709/226 |
| 2014/0143841 A1 | 5/2014 | Karaoguz et al. | | |
| 2015/0032813 A1 | 1/2015 | Doshi et al. | | |
| 2015/0088995 A1 | 3/2015 | Park et al. | | |

(Continued)

FOREIGN PATENT DOCUMENTS

EP 1 667 411 6/2006

*Primary Examiner* — Ryan J Jakovac
(74) *Attorney, Agent, or Firm* — Fish & Richardson P.C.

(57) ABSTRACT

Systems, methods, devices and non-transitory, computer-readable mediums are disclosed for device-to-device caching. In some implementations, a method includes: registering, by an electronic device, a cache service on a local area network (LAN), the LAN including other registered electronic devices; generating, by the electronic device, a content map for cached content, the content map generated from descriptors of the cached content and including data indicating that the cached content described by the content descriptors is possibly cached or is definitely not cached by the electronic device; advertising, by the electronic device, the registered cache service and the content map; receiving, by the electronic device, a request for content from a requesting electronic device registered on the LAN; determining, by the electronic device, that the requested content is cached; and sending, by the electronic device, the requested content to the requesting electronic device.

16 Claims, 6 Drawing Sheets

(56) References Cited

U.S. PATENT DOCUMENTS

| | | | |
|---|---|---|---|
| 2015/0095637 A1* | 4/2015 | Liddicott | H04L 9/0643 713/154 |
| 2015/0117430 A1* | 4/2015 | Zhuang | H04L 67/16 370/338 |
| 2016/0057243 A1* | 2/2016 | Gupta | H04L 67/2814 709/203 |
| 2016/0285671 A1* | 9/2016 | Rangarajan | H04L 41/0233 |
| 2016/0315781 A1* | 10/2016 | Dronadula | H04L 12/1886 |

* cited by examiner

DEVICE-TO-DEVICE CACHING

TECHNICAL FIELD

The disclosure relates generally to client/server computer systems, and more particularly to cache servers.

BACKGROUND

The speed at which content may be downloaded from a network server to a client device is limited by network server bandwidth. Additionally, the network server may be out of service, preventing the client device from downloading the content. A cache server (or "cache engine") is a dedicated network server (or service acting as a server) that saves Web pages or other digital assets locally. By placing previously requested information in temporary storage (or cache) a cache engine speeds up access to content and reduces demand on Internet bandwidth consumption.

SUMMARY

Systems, methods, devices and non-transitory, computer-readable mediums are disclosed for device-to-device caching.

In some implementations, a method comprises: registering, by an electronic device, a cache service on a local area network (LAN), the LAN including other registered electronic devices; generating, by the electronic device, a content map for cached content, the content map generated from descriptors of the cached content and including data indicating that the cached content described by the content descriptors is possibly cached or is definitely not cached by the electronic device; advertising, by the electronic device, the registered cache service and the content map; receiving, by the electronic device, a request for content from a requesting electronic device on the LAN; determining, by the electronic device, that the requested content is cached; and sending, by the electronic device, the requested content to the requesting electronic device.

In some implementations, a method comprises: receiving, by a first electronic device a request for content, the first electronic device coupled to a local area network (LAN); generating, by the first electronic device, a content map from a descriptor of the requested content; comparing, by the first electronic device, the content map to other content maps generated by other electronic devices registered on the LAN; determining, by the first electronic device and based on the comparing, that a second electronic device registered on the LAN possibly has cached the requested content or definitely has not cached the requested content; and sending, by the first electronic device, a request for the requested content to the second electronic device.

Other implementations are directed to systems, devices and non-transitory, computer-readable mediums. Particular implementations provide at least the following advantages. LAN devices can obtain content locally rather than from a remote network server (network server outside the LAN), thus providing faster downloads. The disclosed implementations also conserve power on battery-powered LAN devices by only powering up LAN devices that have advertised, by way of a content map, that the LAN device has possibly cached the requested content.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DESCRIPTION

Example System

Figure 1:
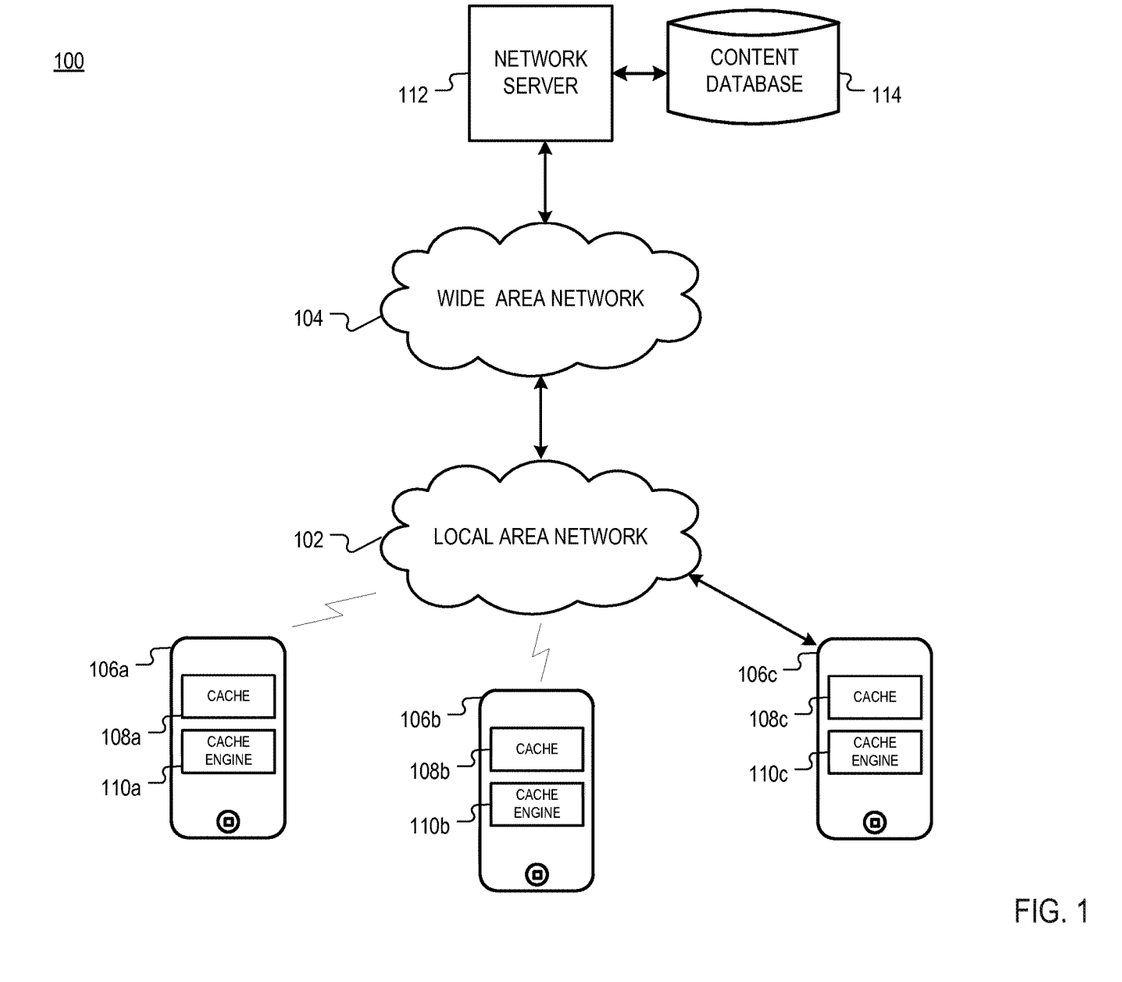
FIG. 1 is a conceptual block diagram of an example system for device-to-device caching.

FIG. 1 is a conceptual block diagram of an example system for device-to-device caching. In some implementations, system 100 can include LAN 102 coupled to wide area network (WAN) 104 (e.g., the Internet) and LAN devices 106a-106c (collectively, LAN devices 106). WAN 104 is coupled to network server 112 which is coupled to content database 114. Content database 114 can store digital content, including but not limited to: Web pages, documents, photo libraries, backup data, video files and audio files.

LAN devices 106 may include but are not limited to: notebook computers, desktop computers, tablet devices, smartphones, television set-top boxes and wearable devices (e.g., a smart watch). In some implementations, LAN 102 can be a home network and LAN devices 106 may belong to individual family members. In some implementations, one or more LAN devices 106 may belong to one family member. Each of LAN devices 106 may be coupled to LAN 102 either wirelessly or through a wired connection (e.g., Ethernet connection).

In the example shown, LAN devices 106a-106c each include caches 108a-108c (collectively, caches 108) and cache engines 110a-110c (collectively, cache engines 110). In some implementations, each cache engine (CE) can be part of an operating system running on a LAN device. The CE can include both a server function and a caching function. For example, CE 110a can accept a cache service request from LAN device 106b and deliver content stored in cache 108a in response to the request. Additionally, cache 108a can cache content (e.g., Web pages, applications) downloaded from network server 112 over WAN 104 or received from another LAN device. At any given time, some or all of LAN devices 106 may be operating in power savings mode (e.g., "sleep mode"). When operating in a power savings mode, a LAN device may be awakened by LAN 102 to respond to a cache service request from another LAN device. For example, LAN device 106a can request LAN device 106b to send requested content. If LAN device 106b is operating in power savings mode, the request would cause LAN device 106b to power up (exit sleep mode) to service the request.

In some implementations, LAN 102 can include edge cache servers (not shown) in addition to LAN devices 106 for providing caching services for LAN 102. LAN devices 106 can request data from the edge cache servers and or other LAN devices 106 that are configured as cache servers/engines.

Figure 2:
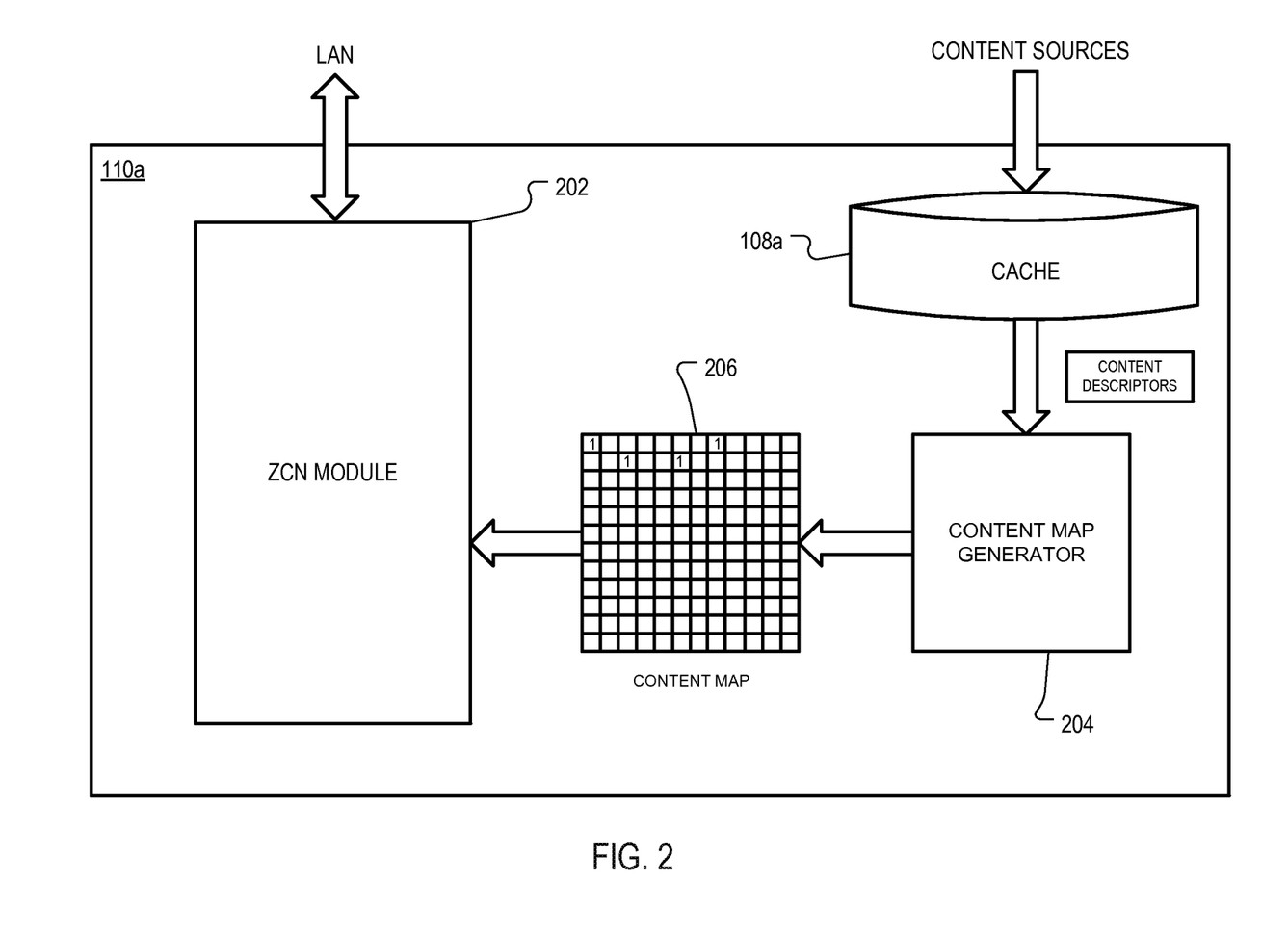
FIG. 2 is a conceptual block diagram of an example cache engine of a LAN device.

FIG. 2 is a conceptual block diagram of an example CE 110a of LAN device 106a. CE 110b and CE 110c operate in a similar manner. In some implementations, CE 110a can include zero configuration networking (ZCN) module 202, cache 108a and content map generator 204.

ZCN module 202 can be implemented in software (e.g., as part of an operating system or an application) and code for performing various zero configuration networking tasks for LAN device 106a. These tasks can include but are not limited to: advertising a cache service (Publication), browsing for available cache services (Discovery) and translating cache service instance names to addresses and port numbers for use (Resolution).

To publish a cache service, LAN device 106a registers a service name (e.g., "local caching") with a Multicast Domain Name Service (DNS) responder, either through a high-level Application Programming Interface (API) or by communicating directly with the responder. In some implementations, a hash of user identifier or the owner of a group account is appended to the service name to allow choosing a caching service for the right user or group, since a LAN device can have multiple caching services for multiple logged-in users.

In some implementations, when the cache service is registered, three related DNS records are created: a service (SRV) record, a pointer (PTR) record, and a text (TXT) record. The SRV record maps the name of the cache service instance to the information needed by a LAN device to actually use the cache service. LAN devices 106 each store a cache service instance name as a persistent way to access the cache service and perform a DNS query for the host name and port number at connection time. In some implementations, the SRV record includes a host name and port number to identify the cache service. The host name is the domain name where the cache service can currently be found. The port number identifies the UDP or TCP port for the cache service. An example name for an SRV record for a cache service in LAN 102 can be "local caching <hash>._server?._tcp.local," where <hash> is the hashed user or group identifier. Other SRV record names are also possible and named according to the following convention: <Instance Name>.<Service Type>.<Domain>.

PTR records enable cache service discovery by mapping the cache service to a list of names of specific instances of cache service. This enables cache services to be found by looking up PTR records labeled with the cache service type.

The TXT record has the same name as the corresponding SRV record and can contain a small amount of additional information about the service instance, typically no more than 100-200 bytes at most. If more data is needed, the host can establish a connection with the client and send the data directly. This however, would require the client to be powered-up, which for battery powered devices may be undesirable. In some implementations, content map 206 is added to the TXT record. As described below, content map 206 is generated by content map generator 204 and includes data representing content in cache 108a. Because of the limited size of the TXT record and the desire not to wake up battery-powered LAN devices 106, the content map 206 should be compact. In some implementations, content map generator 204 implements a Bloom filter to generate a compact bit array that represents cached content descriptors by bit array positions, as described in further detail below.

A Bloom filter is a space-efficient probabilistic data structure that is used to test whether an element is a member of a set. False positive matches are possible but false negatives are not. In some implementations, an empty Bloom filter is a bit array of m bits all set to 0. A number k of different hash functions are used to map or hash cached content descriptors to one of the m array positions with a uniform random distribution. A content descriptor is added by inputting it to each of the k hash functions to get the k array positions. The k array positions (one for each hash) is set to 1. To test whether a content descriptor is in the array, the content descriptor is input to each of the k hash functions to get k array positions. If any of the bits at these k array positions is 0, the content descriptor is definitely not in the array. If all of the k array positions are 1, then either the element is in the array or the bits have by chance been set to 1 during the insertion of other content descriptors in the array, resulting in a false positive. Some examples of content descriptors include but are not limited to: a Uniform Resource Identifier (URI) or Uniform Resource Name (URN) for content data sources, Uniform Resource Locator (URL) for a Web page, a container identifier identifying a chunk of data stored on a network and Universally Unique Identifier (UUIDs), included but not limited to: ISAN, UMID, ISRC, CID, CRID, ISWC, ISMN, DOI and GUID. In some implementations, whenever new content is added or removed from cache 108a, content map generator 204 generates a new content map 206. This function is particularly important for bit arrays generated by a Bloom filter to avoid the introduction of false negatives into the bit array.

After content map 206 is generated, ZCN module 202 adds content map 206 to the TXT record. The TXT record can be requested by other LAN devices 106 and used to select a LAN device for cache service. For example, if a user of LAN device 106a attempts to download a family photo stream from network server 112, CE 110a will check to see if cache 108a has the photo. If not, CE 110a requests TXT records from LAN devices 106b, 106c. CE 110a then inputs a content descriptor for the family photo stream into content map generator 204. If a Bloom filter is used, the content descriptor is input to each of k hash functions to get k array positions of the m bit array. The k array positions are then compared to the k array positions of the content maps added to the TXT records using, for example, bitwise Boolean AND operations. If any of the bits at the k array positions is 0, the content descriptor for the family photo stream is definitely not in the content map. If all of the k array positions are 1, then either the content descriptor is in the content map or the bits have by chance been set to 1 during the insertion of other content descriptors, resulting in a false positive.

After processing all of the content maps in the TXT records there will be one or more content maps that indicate that the family photo stream is possibly cached or definitely not cached. If both the content maps for LAN devices 106b, 106c indicate that the family photo stream is definitely not cached, LAN device 106a will request the family photo stream from network server 112 through WAN 104. If the content maps indicate that the family photo stream is possibly cached by LAN device 106b but not LAN 106c, LAN device 106b is selected by LAN device 106a to provide the cache service. LAN device 106a will then send a request to LAN device 106b for the family photo stream. If LAN device 106b has, in fact, the family photo stream cached, the cached family photo stream will be served to LAN device 106a. This may require LAN device 106b to transition from a power savings mode to service the request. If LAN device 106b does not, in fact, have the family photo stream (a false positive), LAN device 106a will then request the family photo stream from network server 112 through WAN 104.

If, however, the content maps for LAN device 106b and LAN device 106c both indicated that the family photo stream was possibly cached, then after failing to retrieve the family photo stream from LAN device 106b, LAN device 106a requests the family photo stream from LAN device 106c. If LAN device 106c does not, in fact, have the family photo stream (another false positive), LAN device 106a will request the family photo stream from network server 112 through WAN 104.

In some cases, the content maps for two or more LAN devices (e.g., LAN devices 106b, 106c) will provide content maps that indicate that the requested content is possibly cached. Using the example above, CE 110a of LAN device 106a will select one of LAN devices 106b, 106c to provide the family photo stream based on the advertised capabilities of LAN devices 106b, 106c. Each of LAN devices 106b, 106c includes a list of capabilities in their respective SRV or TXT records, which can be advertised as part of, for example, a service name, the same TXT record or a different but related TXT record. Some example capabilities can include but are not limited to: power source (battery power, plugged into wall outlet), battery life, memory or other storage capacity, wireless capabilities, processing bandwidth and any other capability that could influence the selection. For example, if LAN device 106c is a desktop computer plugged into a wall outlet and LAN device 106b is a battery-powered tablet computer with low battery life, then LAN device 106a may select LAN 106c to provide the family photo stream so as not to wake up the battery-powered LAN device 106b. If, however, the bandwidth of LAN device 106c is low (already downloading multiple content streams) and the battery life of LAN device 106b is full, then LAN device 106a may select LAN device 106b to get the family photo stream more quickly.

In some implementations, a priority score can be calculated based on a sum of weighted capability factors. Each capability factor can be assigned an integer from 1-5. A power capability factor can be weighted more (assigned a 5) than memory or storage capacity capability factor (assigned a 3). The LAN device with the highest priority score for its advertised capabilities can be selected from, for example, a list sorted in descending or ascending order by priority score. If the list is sorted in descending order, the LAN device at the top of the list is selected first to provide the family photo stream. If the selected LAN device does not, in fact, cache the family photo stream, the next LAN device on the sorted list can be selected and so forth until the list is exhausted, at which time the family photo stream can be downloaded from network server 112 through WAN 104. In some implementations, the LAN device requests the content from all eligible caching services on the LAN at the same time and then cancels all the requests except for the request that receives a response first.

In some implementations, if the content is not cached locally, the requesting LAN device can select another LAN device to download the content from network server 112. For example, LAN device 106a may select LAN device 106c (desktop with outlet power and wired to the router's Ethernet port) because LAN device 106c may be more stable and will consume less power for large downloads (e.g., movies).

Example Processes

Figure 3:
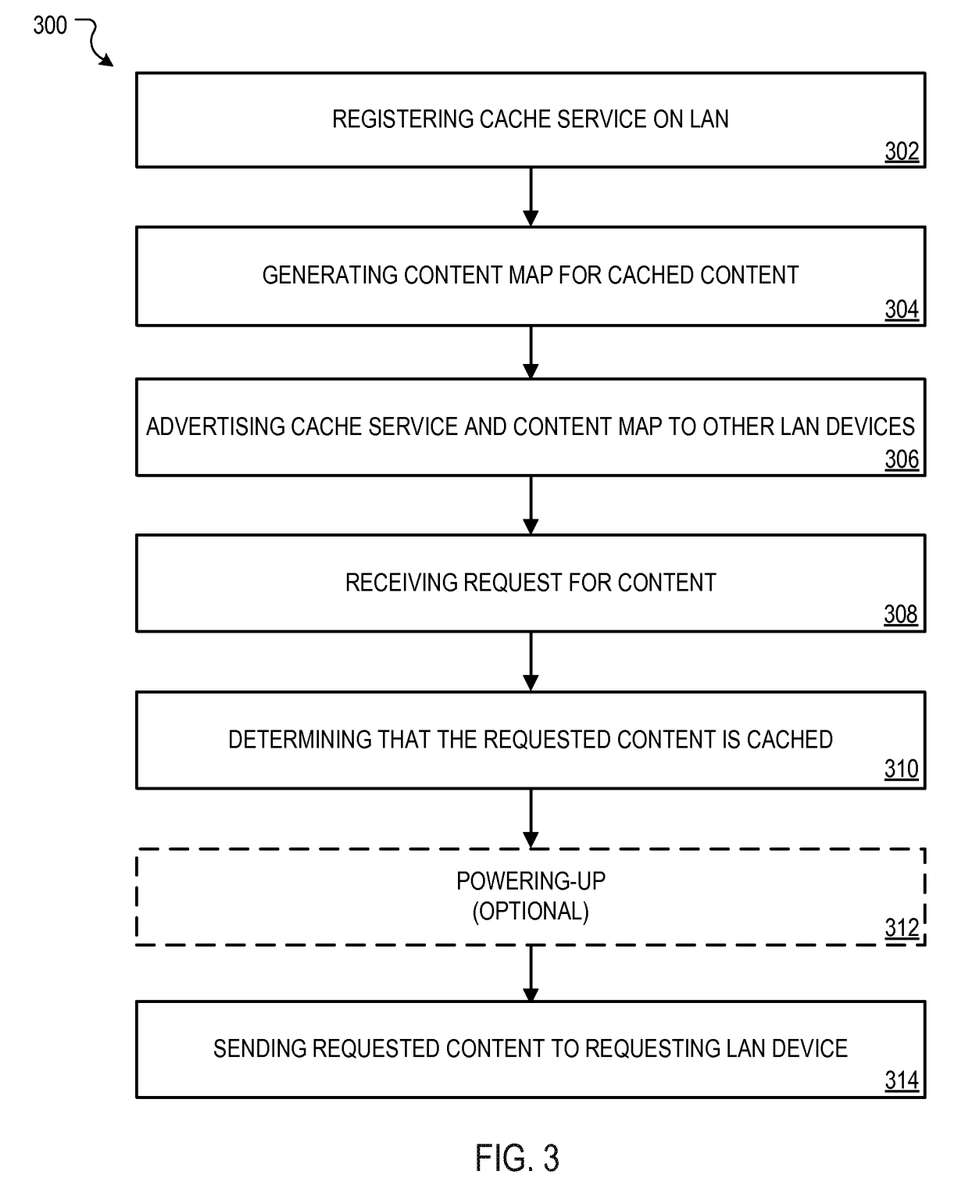
FIG. 3 is a flow diagram of an example process performed by a LAN device to register and configure a cache engine.

FIG. 3 is a flow diagram of an example process 300 performed by a LAN device to register and configure a cache engine. Process 300 can be implemented by, for example, device architecture 500 as described in reference to FIG. 5.

In some implementations, process 300 can begin by registering a cache service on the LAN (302). For example, the LAN device can register a cache service on the LAN by registering a service name. A hash of a user or group identifier can be appended to the service name to allow choosing a cache service for the right user or group, since the LAN device could have multiple caching services for multiple logged-in users. In some implementations, the hash can be generated by a message-digest algorithm (e.g., MD5). Only registered devices would know the hash value and only requests to the service name with the appended hash value would receive a response for cache service.

Process 300 can continue by generating a content map for cached content (304). The cached content can originate from a variety of content sources, such as from a network server or other LAN device. In some implementations, the content map is generated by applying a Bloom filter to content descriptors, as described in reference to FIG. 2. The output of the Bloom filter is a bit array, which can be used to determine whether the content described by the content descriptors is possibly cached or definitely not cached on the LAN device.

Process 300 can continue by advertising the cache service and the content map to other LAN devices (306). For example, each registered LAN device is a cache engine that can advertise a cache service and content map and receive requests for cached services from other LAN devices.

Process 300 can continue by receiving a request for content from a LAN device (308) and determining that the requested content is, in fact, cached (310). If the content is cached, the LAN device can optionally power-up (312) to get ready to serve the requested content. For example, if the LAN device is in a power savings mode ("sleep mode"), the LAN device can transition out of the power savings mode to, for example, a full power mode. If the content is not cached, the LAN device does not respond to the request.

Process 300 can continue by sending the requested content to the requesting LAN device (314). The requested content can be sent using known network protocols (e.g., TCP/IP, UDP).

Figure 4:
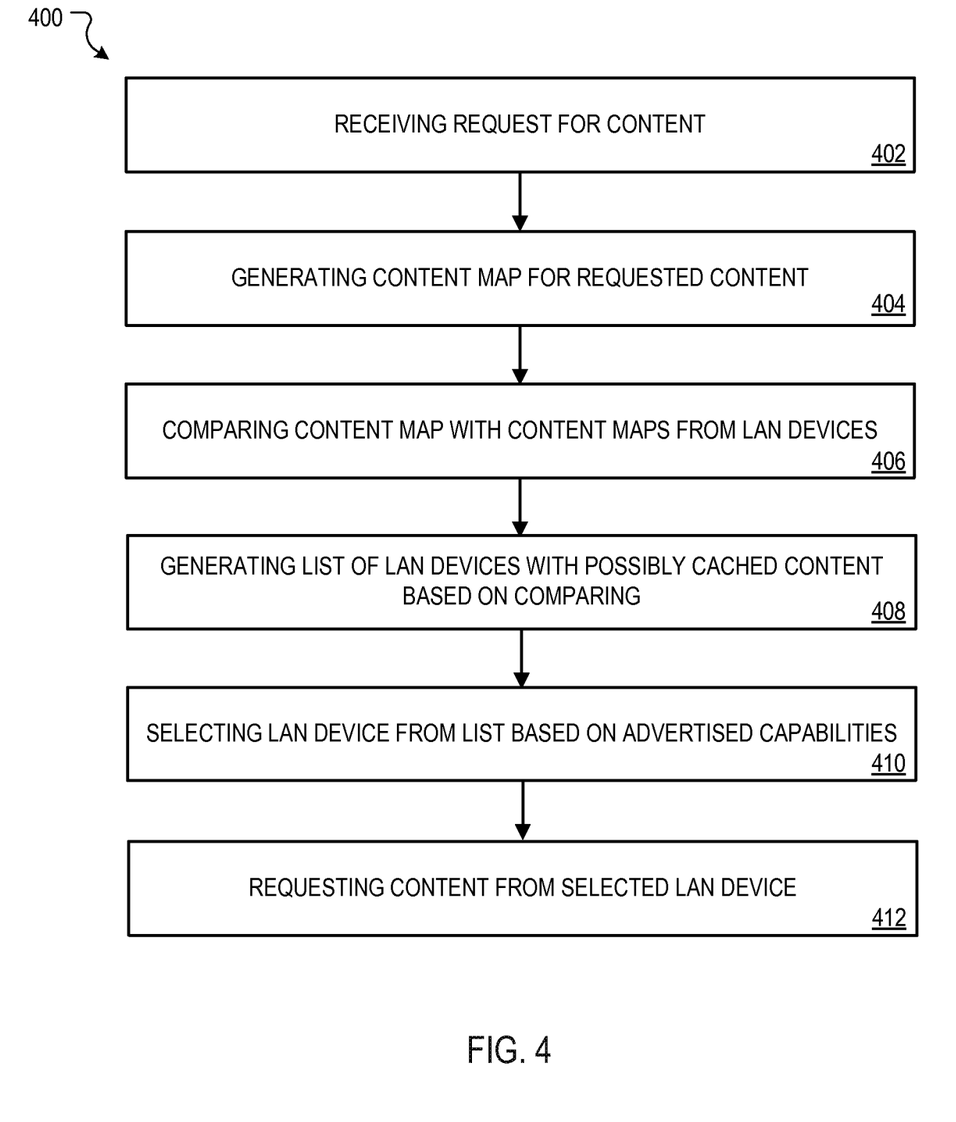
FIG. 4 is a flow diagram of an example process performed by a LAN device to request content from another LAN device.

FIG. 4 is a flow diagram of an example process 400 performed by a LAN device to request content from another LAN device. Process 400 can be implemented by, for example, device architecture 500 as described in reference to FIG. 5.

In some implementations, process 400 can begin by receiving a request for content (402). An application or the operating system may request the content in response to actions by a user. For example, a user may initiate a request to download an application or media item (e.g., photo stream, song). This would generate a request for content to the cache engine to look for requested content locally before retrieving the content from a network service external to the LAN.

Process 400 can continue by generating a content map for the requested content (404). In some implementations, the content map is generated by applying a Bloom filter to a content descriptor for the requested content, as described in reference to FIG. 2.

Process 400 can continue by comparing the content map to content maps generated by registered LAN devices (406).

For example, if the content maps are bit arrays then corresponding bit array positions can be compared for the presence or absence of 1 value using, for example, bitwise Boolean AND operations on the corresponding array positions.

Process 400 can continue by generating a list of LAN devices that possibly have cached the requested content based on a result of the comparing step (408).

Process 400 can continue by selecting a LAN device from the list of LAN devices based on advertised capabilities of the LAN devices (410). For example, each LAN device can be assigned a priority score based on their respective capabilities. The capability factors can be weighted (e.g., assigned an integer value from 1-5) based on any desired criteria. The priority score can be based on a sum of weighted capability factors. The list of LAN devices can be sorted in descending or ascending order by priority scores. If the list is sorted in descending order then the LAN device at the top of the list is selected to provide the requested content.

Process 400 can continue by requesting the requested content from the selected LAN device (412). If it turns out that the selected LAN device does not, in fact, have the requested content (e.g., based on a failure to respond to a request), the requesting LAN device can send a request for the content to the next LAN device on the list and so forth until the list is exhausted, at which time the LAN device can request the content from a network server external to the LAN.

Example LAN Device Architecture

Figure 5:
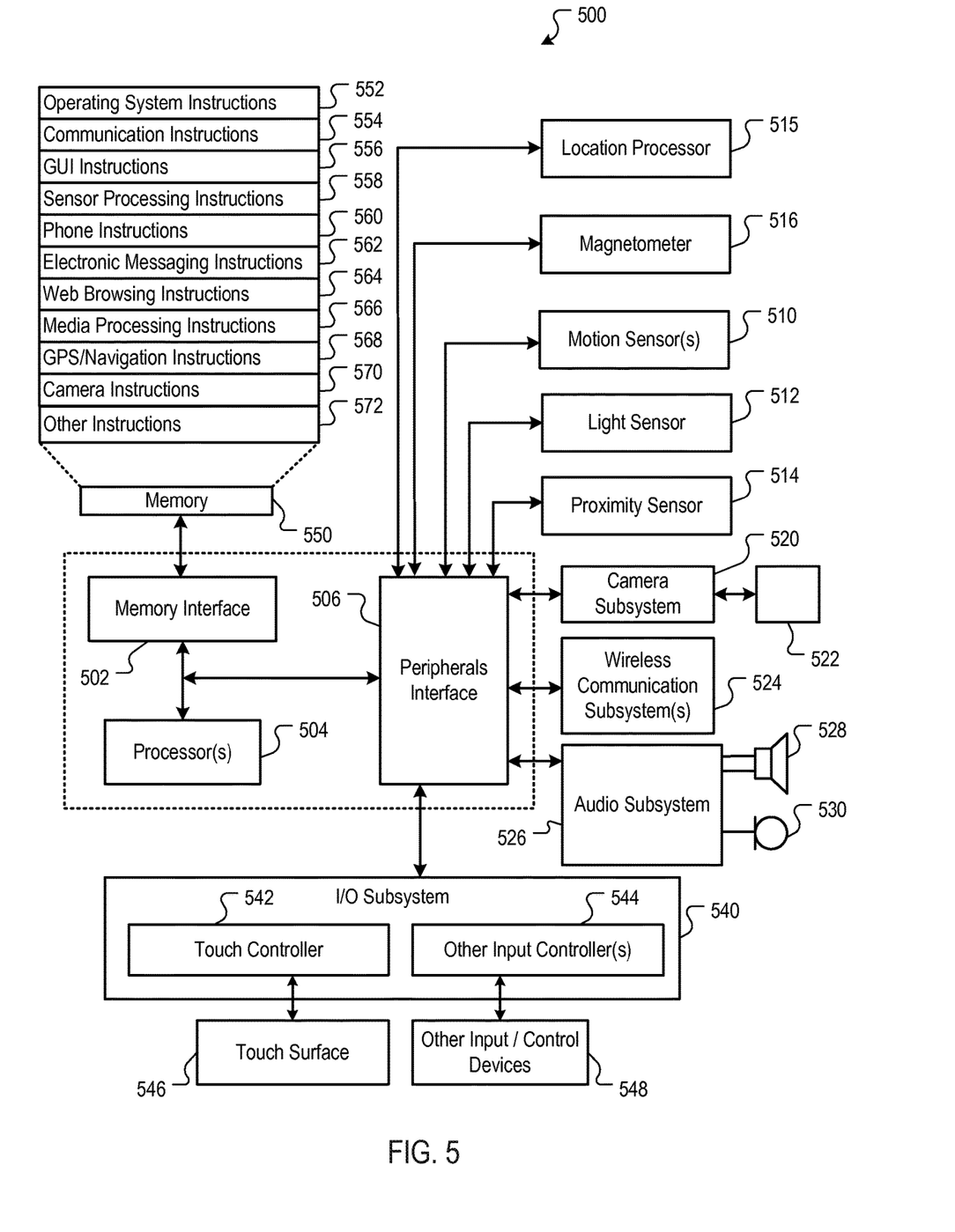
FIG. 5 is a block diagram of an example LAN device architecture for implementing the features and processes described in reference to FIGS. 1-4.

FIG. 5 is a block diagram of an example LAN device architecture 500 for implementing the features and processes described in reference to FIGS. 1-4. Architecture 500 may be implemented in any location aware mobile device for generating the features described in reference to FIGS. 1-4, including but not limited to portable computers, smart phones, tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 506, such as a temperature sensor, a biometric sensor, or other sensing device, to facilitate related functionalities.

Location processor 515 (e.g., GNSS receiver chip) may be connected to peripherals interface 506 to provide geo-referencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device. Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

Example Network Server Architecture

Figure 6:
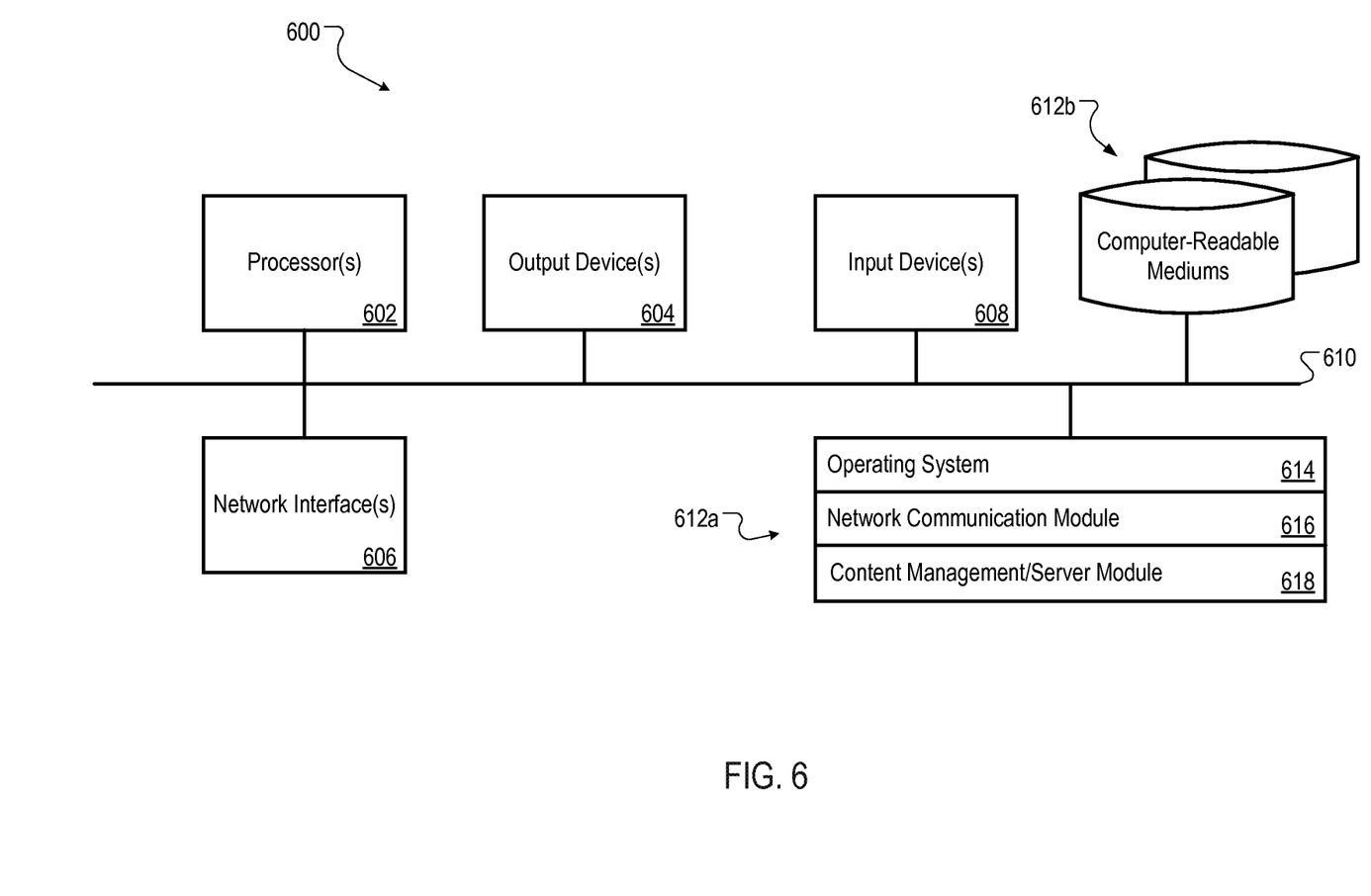
FIG. 6 is a block diagram of an example network server architecture for implementing the features and processes described in reference to FIGS. 1-4.

FIG. 6 is a block diagram of an example network server architecture 600 for implementing the features and processes described in reference to FIGS. 1-4. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more non-transitory computer-readable mediums 612b and memory 612a (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "non-transitory computer-readable medium" refers to any medium that participates in providing instructions to processor 602 for execution, including without limitation, non-volatile media (e.g., optical or magnetic disks) and volatile media (e.g., memory).

Computer-readable mediums 612b or memory 612a can further include operating system 614 (e.g., Mac OS® server, Windows® NT server), network communication module 616 and content management/server module 618. Operating system 614 can be multi-user, multiprocessing, multitasking, multithreading, real time, etc. Operating system 614 performs basic tasks, including but not limited to: recognizing input from input devices 608 and providing output to output devices 604; keeping track and managing files and directories on storage devices 612b and memory 612a; controlling peripheral devices; and managing traffic on the one or more communication channels 610. Network communications module 616 includes various components for establishing and maintaining network connections (e.g., software for implementing communication protocols, such as TCP/IP, HTTP, etc.). Content management/server module 618 manages content stored in computer-readable mediums 612b and downloads content to requesting client devices, such as LAN devices 106 described in reference to FIGS. 1-4. In some implementations, content management/server 618 is a Web server or online digital media store. LAN devices 106 store the content downloaded from the network server in their respective caches 108.

Architecture 600 can be included in any computer device, including one or more server computers each having one or more processing cores. Architecture 600 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A method comprising:
registering, by an electronic device on a local area network (LAN), a service name of the electronic device, the LAN including other registered electronic devices, wherein the service name of the electronic device is a unique identifier of the electronic device on the LAN, the service name further including a hashed identifier corresponding to an account associated with the electronic device;

registering, based on the registered service name of the electronic device, a cache service of the electronic device on the LAN;

generating, by the electronic device, a content map for content corresponding to the account cached in the electronic device, the content map generated from descriptors of the cached content;

advertising, by the electronic device to the other registered electronic devices on the LAN, the registered cache service of the electronic device and the content map of the electronic device;

receiving, by the electronic device, a request for content from a requesting electronic device of the other of electronic devices on the LAN, the request including the registered service name of the electronic device and the hashed identifier corresponding to the account;

determining, by the electronic device, using the hashed identifier, that the requested content is cached in the electronic device corresponding to the account; and sending, by the electronic device, the requested content to the requesting electronic device.

2. The method of claim 1, wherein generating a content map for cached content further comprises:
applying, by the electronic device, a filter to the cached content to generate a bit array;
adding, by the electronic device, the bit array to a record of the electronic device; and
sending, by the electronic device, the record of the electronic device to the other electronic devices.

3. The method of claim 1, further comprising:
determining, by the electronic device, that additional cached content has been added to or removed from the electronic device; and
regenerating, by the electronic device, an additional content map.

4. The method of claim 1, wherein advertising the registered cache service further comprises:
advertising, by the electronic device, capabilities of the electronic device.

5. The method of claim 1, wherein determining that the requested content is cached in the electronic device corresponding to the account further comprises:
determining, by the electronic device, that the electronic device is in a power savings mode; and
in response to determining that the electronic device is in a power savings mode, transitioning the electronic device out of the power savings mode to service the request.

6. An electronic device comprising:
one or more processors;
memory coupled to the one or more processors and configured to store instructions, which, when executed by the one or more processors, cause the one or more processors to perform operations comprising:
registering a service name on a local area network (LAN), the LAN including other registered electronic devices,
wherein the service name of the electronic device is a unique identifier of the electronic device on the LAN, the service name further including a hashed identifier corresponding to an account associated with the electronic device;
registering, based on the registered service name, a cache service on the LAN;

generating a content map for content corresponding to the account cached in the electronic device, the content map generated from descriptors of the cached content;

advertising the registered cache service of the electronic device and the content map of the electronic device to the other registered electronic devices on the LAN;

receiving a request for content from a requesting registered electronic device of the other electronic devices on the LAN, the request including identification of the registered service name and the hashed identifier corresponding to the account;

determining, using the identifier, that the requested content is cached in the electronic device corresponding to the account; and sending the requested content to the requesting registered electronic device.

7. The electronic device of claim 6, wherein generating a content map for cached content further comprises:
applying a filter to the cached content to generate a bit array;
adding the bit array to a record; and
sending the record to the requesting registered electronic device.

8. The electronic device of claim 6, further comprising:
determining that cached content has been added or removed; and
regenerating the content map.

9. The electronic device of claim 6, wherein advertising the registered cache service further comprises:
advertising capabilities of the electronic device.

10. The electronic device of claim 6, wherein determining that the requested content is cached in the electronic device corresponding to the account further comprises:
determining that the electronic device is in a power savings mode; and
in response to determining that the electronic device is in a power savings mode, transitioning the electronic device out of the power savings mode to service the request.

11. The method of claim 1, wherein the registering a cache service of the electronic device on the LAN includes creating service (SRV), pointer (PTR), and text (TXT) records related to a Domain Name Service (DNS) responder.

12. The method of claim 11, wherein the SRV record identifies the cache service, the PTR record enables cache service discovery, and the TXT record contains information associated with the cache service.

13. The electronic device of claim 6, wherein the registering a cache service includes creating service (SRV), pointer (PTR), and text (TXT) records related to a Domain Name Service (DNS) responder.

14. The electronic device of claim 13, wherein the SRV record identifies the cache service, the PTR record enables cache service discovery, and the TXT record contains information associated with the cache service.

15. A method comprising:
transmitting, by a requesting electronic device on a local area network (LAN), a request for content, the request including identification of a registered service name of another electronic device on the LAN,
wherein the service name of the other electronic device is a unique identifier of the other electronic device on the LAN, the service name further including a hashed identifier corresponding to an account associated with the other electronic device;

receiving, in response to the request, a content map for content corresponding to the account cached in the other electronic device, the content map generated from descriptors of the cached content;

determining, by the requesting electronic device based on the content map, whether the requested content is cached in the other electronic device corresponding to the account; and in response to determining that the requested content is cached in the other electronic device, transmitting a second request for the requested content to the other electronic device.

16. The method of claim 15, wherein the other electronic device is in a power savings mode, and wherein the second request for the content includes a device wake up request to power up the other electronic device from the power savings mode.

* * * * *